United States Patent [19]
Olry et al.

[11] Patent Number: 6,009,605
[45] Date of Patent: Jan. 4, 2000

[54] METHOD FOR MAKING FIBROUS PREFORMS FOR PRODUCING ANNULAR PARTS FROM A COMPOSITE MATERIAL

[75] Inventors: Pierre Olry, Bordeaux; Dominique Coupe, Le Haillan; Bruno Bompard, Lyons; Jean Aucagne, La Tour du Pin, all of France

[73] Assignee: Societe Nationale D'Etude et de Construction de Moteurs D'Aviation, Paris, France

[21] Appl. No.: 09/077,128

[22] PCT Filed: Nov. 26, 1996

[86] PCT No.: PCT/FR96/01869

§ 371 Date: May 22, 1998

§ 102(e) Date: May 22, 1998

[87] PCT Pub. No.: WO97/20092

PCT Pub. Date: Jun. 5, 1997

[30]     Foreign Application Priority Data

Nov. 27, 1995  [FR]  France ................................ 95 14000

[51] Int. Cl.[7] ........................................................ D04H 3/10
[52] U.S. Cl. .............................................. 28/107; 28/114
[58] Field of Search ........................... 28/107, 109, 110, 28/143, 108, 111, 112, 113, 114, 115; 138/124, 129, 137, 141, 144

[56]     References Cited

U.S. PATENT DOCUMENTS

| | | | |
|---|---|---|---|
| 1,610,173 | 12/1926 | Slade | 138/137 |
| 3,936,552 | 2/1976 | Krupp et al. | 428/64 |
| 3,952,121 | 4/1976 | Dilo | 428/36 |
| 4,657,795 | 4/1987 | Foret | 138/153 |
| 4,790,052 | 12/1988 | Olry | 28/110 |
| 5,203,059 | 4/1993 | Olry et al. | 28/107 |
| 5,217,770 | 6/1993 | Morris, Jr. et al. | 28/110 |
| 5,323,523 | 6/1994 | Lawton et al. | 28/107 |
| 5,513,423 | 5/1996 | Jakob et al. | 28/107 |
| 5,546,880 | 8/1996 | Ronyak et al. | 28/107 |

FOREIGN PATENT DOCUMENTS

| | | |
|---|---|---|
| 0 528 336 A2 | 2/1993 | European Pat. Off. . |
| 0 555 134 A1 | 8/1993 | European Pat. Off. . |
| 2 490 687 | 3/1982 | France . |
| 2 643 656 | 8/1990 | France . |

*Primary Examiner*—Amy B. Vanatta
*Attorney, Agent, or Firm*—Weingarten, Schurgin, Gagnebin & Hayes llp

[57]     ABSTRACT

Fiber preforms for use in the manufacture of composite material annular parts are made by winding superposed layers of a strip of cloth (10) of spiral or helical shape comprising substantially helical warp threads and substantially radial weft threads. The mass per unit area of the warp of the helical cloth increases between its inside diameter and its outside diameter, and the layers of the strip of cloth are needled so as to be bonded together by fibers pulled from the yarn of the cloth, the increase in mass per unit area of the warp at least approximately compensating, in terms of density per unit volume of the preform, the decrease in density of the weft between the inside diameter and the outside diameter.

29 Claims, 5 Drawing Sheets

METHOD FOR MAKING FIBROUS PREFORMS FOR PRODUCING ANNULAR PARTS FROM A COMPOSITE MATERIAL

BACKGROUND OF THE INVENTION

The present invention relates to a method of making fiber preforms for use in manufacturing annular parts of composite material.

A particular but non-exclusive field of application of the invention is manufacturing brake disks out of composite material, in particular brake disks out of carbon-carbon composite.

Annular parts of composite material, such as brake disks, are constituted by fiber reinforcement known as a "preform" which is densified by a matrix. For carbon-carbon composite brake disks, the preform is made of carbon fibers, or of fibers constituting a precursor for carbon that is transformed into carbon by heat treatment after the preform has been made. A particular carbon precursor that is available in fiber form is preoxidized polyacrylonitrile (PAN). The preform can be densified using a liquid—by being impregnated with a liquid precursor of carbon, e.g. a resin, and then by transforming the precursor by heat treatment—or by chemical vapor infiltration.

A well-known method of making fiber preforms for composite material parts consists in superposing and needling together layers or plies of two-dimensional fiber fabric. The fiber fabric may be a woven cloth, for example. The cloth may optionally be covered in a fiber web to provide fibers suitable for being pulled by the needles through the superposed plies; this applies in particular when the fabric is made of fibers that are difficult to needle without breaking the yarns constituted by the fibers, in particular carbon fibers. Such a method is described in particular in documents FR-A-2 584 106 and FR-A-2 584 107 respectively for making preforms that are plane and for making preforms that constitute bodies of revolution.

An annular preform for a brake disk can be cut out from a thick plate made up of layers that are superposed flat and needled together. The loss of material is nearly 50%, and for carbon fiber preforms that represents a very large cost because of the cost price of the fiber material.

To reduce this loss, it has been proposed to make the preform by superposing and needling together annular layers, each made up of an assembly of a plurality of sectors. The sectors are cut out from a two-dimensional fabric such as a woven cloth.

The loss of material is less than when whole rings are cut out, however it is not negligible. In addition, the method is quite difficult to implement and to automate, particularly because of the need to position the sectors correctly while offsetting them from one layer to the next in order to avoid superposing lines of separation between sectors.

It might be thought that annular preforms could be cut from tubes made by winding and simultaneously needling a strip of cloth on a mandrel, as described in above-mentioned document FR-A-2 584 107. The method is relatively easy to implement without loss of fiber material. However, in the application to brake disks, and unlike the embodiments described above, the plies of the preform are then disposed perpendicularly to the rubbing faces. The smaller shear strength parallel to the plies can constitute a major drawback in the vicinity of the notches that are formed in the outer or inner periphery of the disks for receiving the splines that serve to transmit or take up the forces exerted on the disks.

Another known technique for making fiber preforms for composite material annular parts consists in using a textile product in the form of a spiral or helical strip which is wound flat to make up superposed turns. The textile product may be a woven cloth comprising helical warp yarns and radial weft yarns.

As described in documents FR-A-2 490 687 and FR-A-2 643 656, the spiral or helical shape is given to the cloth by using at least one frustoconical lap roller for warp yarns paid out from individual spools mounted on a creel. In cloth made in this way, the spacing between the radial weft yarns increases across the width of the helical cloth between its inside diameter and its outside diameter. In order to conserve a uniform character in the cloth over its entire width, the two above-mentioned documents propose inserting additional weft yarns that extend over a fraction only of the width of the cloth from the outside diameter thereof. That solution gives rise to significant extra cost in the manufacture of the cloth and is a source of non-negligible defects.

Another technique described in document EP-A-0 528 336 consists in using a tubular braid. Because of its deformability, the braid, once flattened, can be wound helically to form superposed annular turns that are bonded together by needling. During manufacture of the tubular braid, unidirectional elements can be inserted parallel to the axis of the braid. By appropriately varying the size and/or the mutual spacing of the unidirectional elements between opposite edges of the flattened braid, it is possible to introduce compensation for the variation in the density per unit area of the braid between its two edges as caused by the deformation imparted to the braid while it is being wound as a flat helix. Nevertheless, inserting unidirectional elements makes the braid less deformable. In addition, while the braid is being wound into a helix, the length described by the unidirectional elements varies considerably between the inside circumference and the outside circumference of the annular preform. During manufacture of the braid, document EP-A-0 528 336 does indeed envisage exerting tension to a greater or lesser extent on the unidirectional elements depending on whether they are situated close to the inside circumference or to the outside circumference of the annular preform. However, not only can that obtain only very limited compensation of the different lengths described by the unidirectional elements, there is also no guarantee that the tension will be maintained after the braid has been manufactured, thus giving rise to possible shrinkage and crimping of the unidirectional elements. In addition, inserting unidirectional elements in the tubular braid, particularly if the elements need to be inserted with different tensions, complicates manufacture of the preform considerably.

SUMMARY OF THE INVENTION

An object of the invention is to provide a method that does not have the drawbacks of prior art methods, i.e. a method that makes it possible to make annular preforms for use in the manufacture of composite material parts without loss of material and at relatively low cost, while conserving a substantially constant density of fibers throughout the volume of the preform.

This object is achieved by a method of the type comprising winding superposed layers of a strip of spirally- or helically-shaped cloth having substantially helical warp yarns and substantially radial weft yarns, in which method the mass per unit area of the warp of the helical cloth increases between its inside diameter and its outside diameter, and the layers of the strip of cloth are needled so as to be bonded together by fibers pulled from the yarn of the cloth, the increase in mass per unit area of the warp at least approximately compensating, in terms of density per unit volume of the preform, the decrease in density of the weft between the inside diameter and the outside diameter.

For making composite material annular parts, in particular for brake disks, the Applicant has observed that it is important above all to guarantee a substantially constant filling ratio of fibers throughout the volume of the preform, where fiber filling ratio is the percentage of volume actually occupied by the fibers per unit volume of the preform. Substantially uniform fiber filling ratio implies substantially uniform pore size. The preform can then be densified in substantially homogenous manner, giving substantially uniform characteristics to the composite material throughout its volume.

With the method of the invention, homogeneity of pore size is obtained by the combination of needling and the increase in the mass per unit area of the warp between the inside diameter and the outside diameter.

Increasing the mass per unit area of the warp, instead of increasing that of the weft as in the above-mentioned prior art does indeed make the surface of the helical cloth less homogeneous, to some extent. However, in particular for the disk brake application, this reduction in surface homogeneity remains entirely acceptable, so long as the inside diameter of the cloth is not too small and the difference between the inside and outside diameters is not too great.

In addition, whereas increasing the mass per unit area of the weft by inserting additional weft yarns over a portion of the width of the cloth makes manufacture thereof more difficult and considerably increases cost, the mass per unit area of the warp can be increased simply and without extra cost, e.g. by using warp yarns of increasing size and/or by increasing the sett of the warp yarns between the inside diameter and the outside diameter of the cloth.

Finally, manufacture of the basic fabric, in this case the helical cloth, is not complicated by adding unidirectional elements or additional yarns.

The helical cloth must be suitable for the needling operation without the needles having a destructive effect on the yarns that make up the cloth. When the preform is to be made of carbon or ceramic fibers, it is preferable to use a helical cloth that is constituted at least in part by yarns having discontinuous fibers that can easily be pulled by the needles. These yarns may be made up of carbon or of ceramic fibers, or of fibers made of a precursor for carbon or ceramic, with the precursor being transformed into carbon or ceramic by heat treatment, e.g. performed after the needling.

Advantageously, a helical cloth is used whose yarns are made up of mutually parallel discontinuous fibers that are not twisted, with a covering holding the yarn together, as described in document EP-A-0 489 637. The covering is made using a yarn of sacrificial material that is eliminated prior to needling. Eliminating the covering yarn releases the fibers for needling, and also avoids the presence of any macro pores because the released fibers bulk up.

In a variant, the covered yarn can be replaced by roving made up of parallel discontinuous fibers having sufficient cohesion to enable them to be woven without hindering subsequent needling. This minimum cohesion can be provided by a small amount of twisting, e.g. no more than 15 turns per meter.

The needling is advantageously performed with a density of needle strokes per unit area that is substantially constant over the entire surface of the layers of the strip of cloth. For this purpose, it is possible to use a set of needles occupying a sector that extends over the entire width of the strip of helical cloth.

Also advantageously, the needling is performed to a depth that is substantially constant, and is performed progressively while the strip of helical cloth is being wound flat.

The strip of cloth can be wound about an axis to form superposed layers that are substantially perpendicular to the axis, or to form superposed layers that are frustoconical. The axis around which the strip of cloth is wound can be physically embodied by a tube.

DESCRIPTION OF THE DRAWINGS

Other features and advantages of the method of the invention appear on reading the following description given by way of non-limiting indication and with reference to the accompanying drawings, in which.

DETAILED DESCRIPTION OF THE INVENTION

By way of example, the description relates to making annular preforms of carbon fiber for the manufacture of disk brakes made of carbon-carbon composite material.

Figure 1:
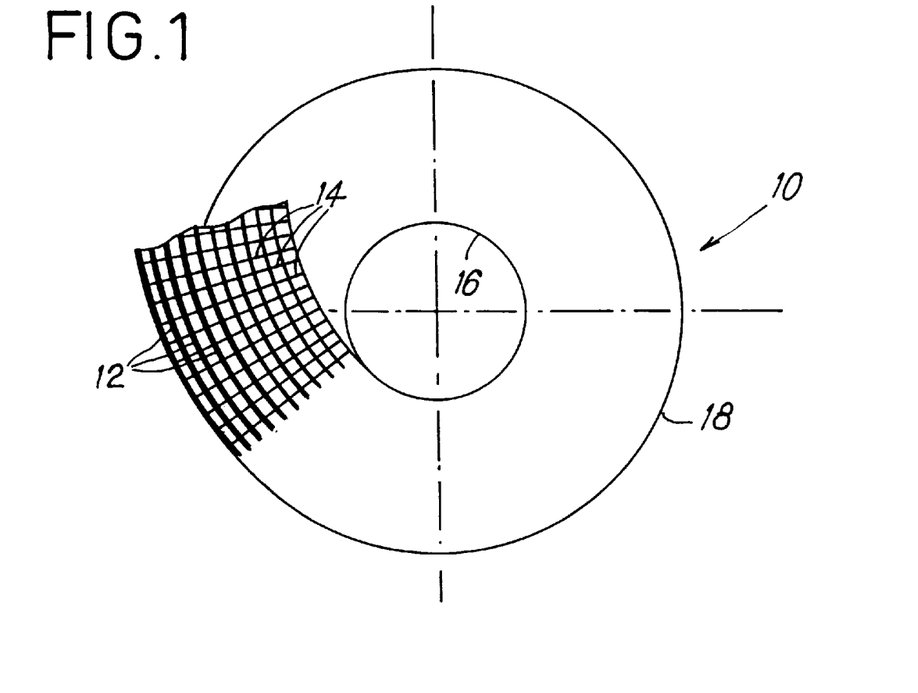
FIG. 1 is a diagrammatic view showing a helically-shaped cloth suitable for implementing a method of the invention.
Figure 2:
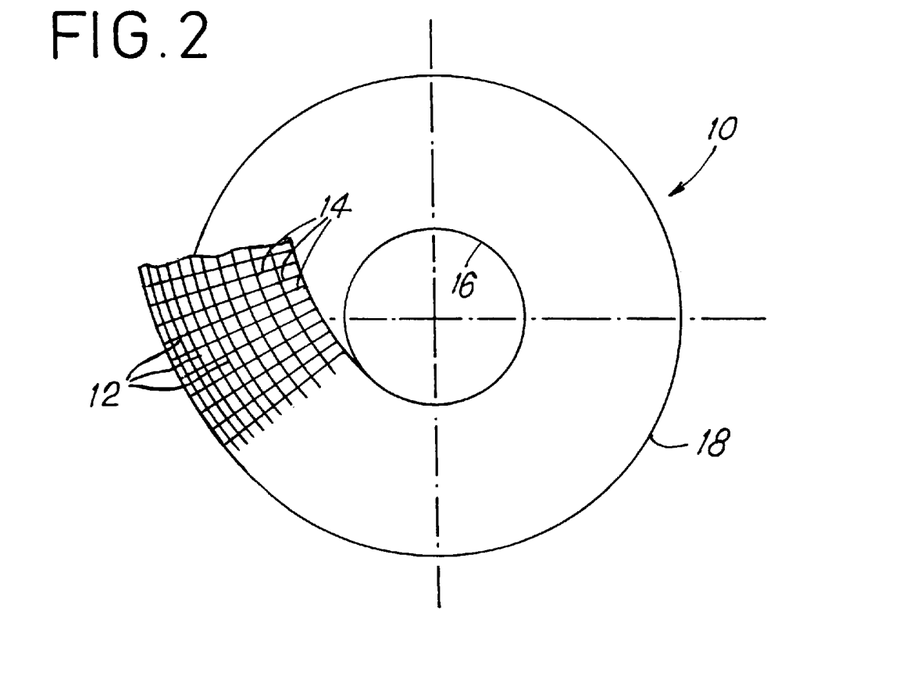
FIG. 2 is a diagram showing a variant embodiment of a helically-shaped cloth also suitable for implementing a method of the invention.

The preforms are made by winding and needling together superposed layers of a strip of helically- or spirally-shaped cloth 10, e.g. as shown in FIG. 1 or in FIG. 2.

The strip of helical cloth 10 is made up of helical warp yarn 12 and radial weft yarn 14. As mentioned above and as described in above-mentioned documents FR-A-2 490 687 and FR-A-2 643 656, weaving is performed by taking the warp yarns 12 from respective feed spools by means of a conical lap roller.

The mutual spacing between the radial weft yarns 14 increases between the inside diameter 16 and the outside diameter 18 of the helical cloth. In order to compensate, at least approximately, for this reduction in mass per unit area of the weft, a substantially corresponding increase is provided in the mass per unit area of the warp.

In the embodiment of FIG. 1, the increase in mass per unit area of the warp is obtained by using warp yarns 14 of varying size, increasing from the inside diameter 16 to the outside diameter 18 of the cloth. This variation may be continuous or in steps. If it is performed in steps, then the warp is subdivided into a plurality of portions in which the warp yarns 14 are all of the same size, which size is different in the other portions of the warp.

In the embodiment of FIG. 2, the increase in mass per unit area of the warp is obtained by increasing the sett of the warp yarns 14 between the inside diameter 16 and the outside diameter 18 of the cloth, i.e. by reducing the spacing between the warp yarns, all of which are of the same size. Sett can be modified continuously or in steps, with the warp being subdivided into a plurality of contiguous portions.

Naturally, it is possible to vary both the size and the sett of the warp yarns 14.

Figure 3:
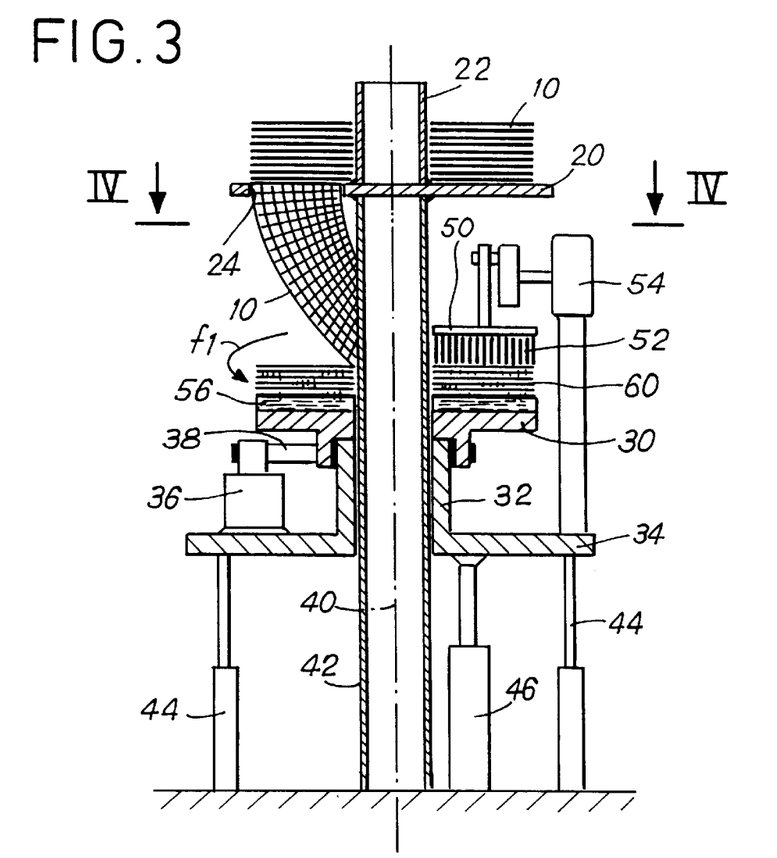
FIG. 3 is a highly diagrammatic view in elevation and in section of a first embodiment of apparatus for implementing a method of the invention.
Figure 4:
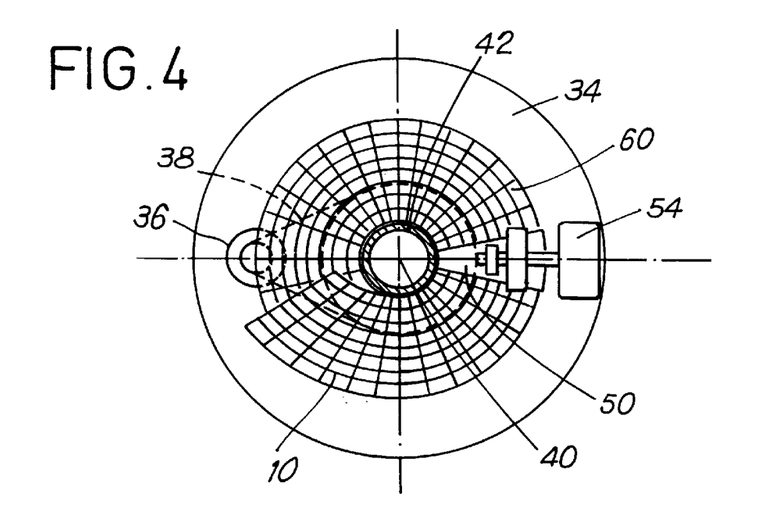
FIG. 4 is a plan view in section on plane IV—IV of FIG. 3.

A first implementation of the method of the invention is shown in FIGS. 3 and 4.

The helical cloth 10 is stored on a fixed horizontal tray 20, being wound in the form of flat superposed turns about a central cylindrical core 22. The disk-shaped tray 20 has a radial slot 24 through which the strip of helical cloth is pulled downwards.

The strip pulled in this way from the storage tray 20 is wound in flat superposed turns on a turntable 30. The turntable 30 is mounted on a vertical shaft 32 secured to a support 34. The support 34 also carries a motor 36 which drives the turntable 30 so that it rotates about its vertical axis 40 (arrow f1), with drive being transmitted via a belt 38.

The assembly comprising the support 34 and the turntable 30 is movable vertically along a fixed central guide tube 42 of axis 40. At its top end, the tube 42 supports the tray 20. The support 34, the turntable 30, and the tray 20 are thus all centered on a common axis. The support 34 rests on vertical telescopic rods 44 with vertical displacement of the support 34 being under the control of one or more actuators 46.

As the strip of helical cloth 10 is wound flat onto the turntable 30, it is needled by means of a board 50 carrying needles 52 and driven with vertical reciprocating motion. The motion of the needle board is controlled by a motor 54 via a crank type transmission. The motor 54 is carried by the support 34.

The strip of helical cloth 10 is needled with substantially constant depth and density per unit area. To obtain constant density of strokes from the needles 52 over the entire area of an annular layer of cloth 10, the needle board 50 is in the form of a sector, corresponding to a sector of an annular layer of cloth, and the needles are distributed uniformly over said sector, while the turntable 30 supporting the preform 60 that is being built up is driven to rotate at constant speed.

The depth of needling, i.e. the distance the needles 52 penetrate on each occasion into the preform 60 is maintained substantially constant, and equal to the thickness of a few superposed layers of cloth, for example. For this purpose, as the strip of cloth 10 is wound onto the turntable 34, the turntable is moved vertically downwards through the appropriate distance to ensure that the relative position between the surface of the preform and the needle board at one end of its vertical stroke remains constant. Towards the end of making the preform 60, after the last turn of cloth 10 has been put into place, several needling passes are performed while continuing to rotate the turntable 30 so that the needling density per unit volume in the surface layers of cloth is substantially the same as in the remainder of the preform. During at least a portion of these final needling passes, the turntable 30 may be caused to move down progressively, as during the preceding stages. This principle of needling to constant depth by progressively lowering the support of the preform accompanied by final needling passes is known, and in particular it is described in above-mentioned document FR-A-2 584 106. In addition, the turntable 30 is coated in a protective layer 56 into which the needles can penetrate without being damaged while needling the first few turns of cloth 10. The protective layer 56 may be in the form of a base felt, e.g. a polypropylene felt, covered in a sheet of plastics material, e.g. a sheet of polyvinyl chloride, thus preventing fibers taken from the base felt being pulled into the preform 60 when the needles rise.

The helical cloth 10 must be suitable for being needled without that excessively damaging the yarns constituting the cloth.

The yarns 14 and 16 may be made of carbon fibers or of fibers of a carbon precursor, e.g. fibers of preoxidized polyacrylonitrile, with the carbon precursor being transformed by subjecting the preform to heat treatment after needling.

Advantageously, the yarns 14 and 16 are made up of discontinuous fibers, e.g. mutually parallel discontinuous fibers that are not twisted, with the yarn being held together by a covering of sacrificial yarn, as described in above-mentioned document EP-A-0 489 637.

The parallel discontinuous fibers can be obtained by controlled stretching and cracking of a cable of carbon multifilaments. The covering yarn is made of a material that can be eliminated by heat or by dissolving, e.g. a water soluble polyvinyl alcohol. The covering serves to hold the yarn together during weaving. The covering yarn is eliminated from the helical cloth before needling, e.g. while the cloth is stored on the tray 20 prior to the tray being put into place on the tube 42.

In a variant, the yarns 14, 16 can be made of roving comprising parallel discontinuous fibers, with cohesion being ensured by a small amount of twisting that is sufficient to make weaving possible without hindering subsequent needling.

The apparatus described above makes it possible to make preforms of various lengths on a continuous basis, with the maximum possible length being determined by the vertical stroke of the support 34 along the tube 42. It may be observed that the tube 42 serves as a guide not only for the assembly comprising the support 34 and the turntable 30, but also for the preform 60 that is being made. Once a preform 60 has been made, it is subsequently sliced on radial planes to obtain annular preforms for disk brakes of desired thickness, which preforms are subsequent densified.

The use of a helical cloth 10 in which the decrease in the weft density between the inside diameter and the outside diameter is compensated by the increase in the warp density makes it possible, after needling, to obtain a preform in which fiber filling ratio and pore size are substantially uniform throughout the entire volume of the preform. In addition, the use of yarns made up of discontinuous fibers allows the fibers to bulk up, thereby avoiding the presence of macro pores, and consequently avoiding irregular densification.

Figure 5:
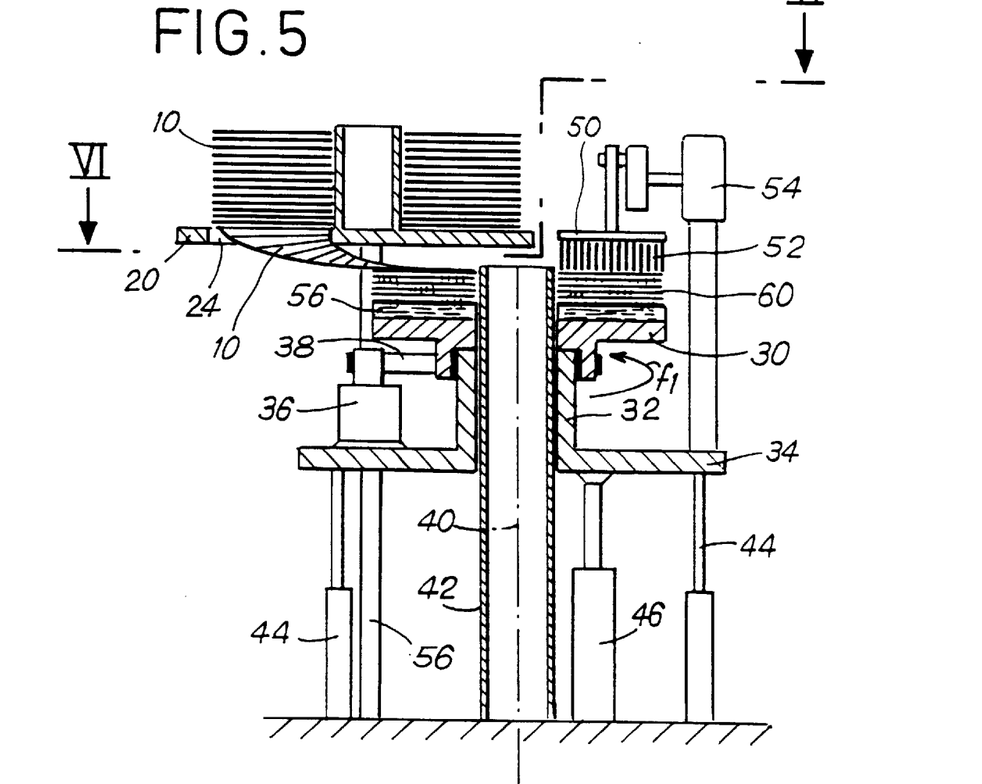
FIG. 5 is a highly diagrammatic view in elevation and in section of a variant embodiment of the apparatus shown in FIGS. 3 and 4.
Figure 6:
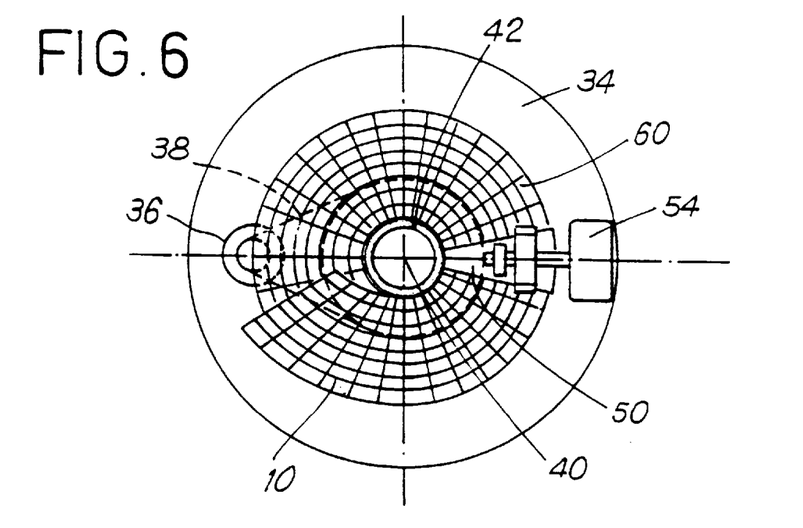
FIG. 6 is a plan view in section on line VI—VI of FIG. 5.

A variant embodiment of apparatus for implementing the method of the invention is shown in FIGS. 5 and 6, which variant differs from the embodiment of FIGS. 3 and 4 solely by the location of the support 20 carrying the helical cloth. In this variant, the support 20 has its vertical axis offset from the axis 40 by a distance which is slightly greater than the length of the needle board 50. As a result, the support 20 can be located to one side of the board 50, thereby minimizing the path followed by the cloth 10 between the radial outlet slot 24 from the support 20 and the top surface of the preform 60 that is being built up. This disposition also makes it possible to reduce the overall height of the apparatus. The support 20 then stands on its own support column 56.

Figure 7:
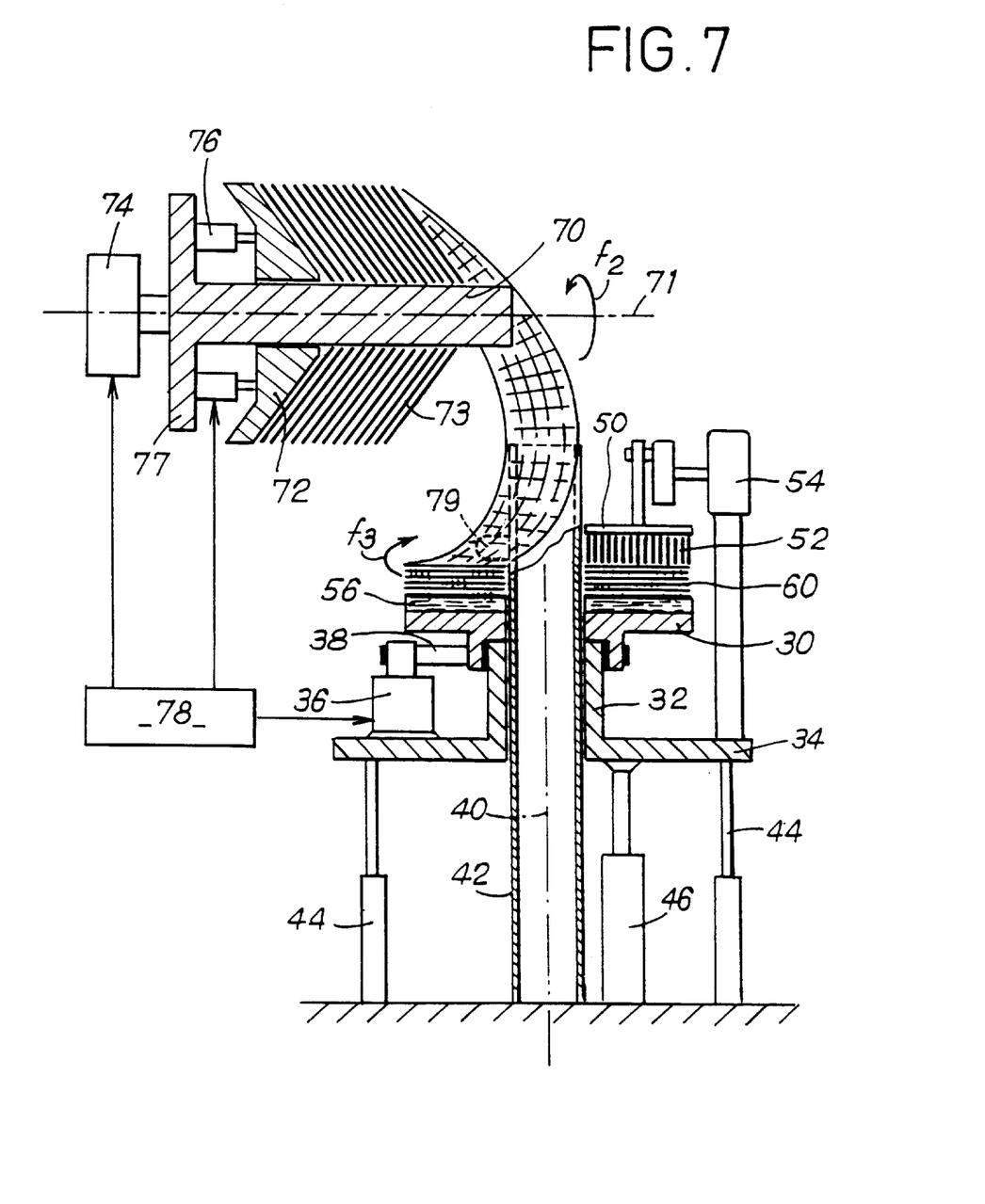
FIG. 7 is a highly diagrammatic view in elevation and in section of another variant embodiment of the apparatus of FIGS. 3 and 4.

Another variant implementation for the helical cloth feed is shown in FIG. 7. The strip of helical cloth 10 is wound on a horizontal rotary mandrel 70 forming a stack 73 of superposed frustoconical plies. The angle between the plies and the axis 71 of the mandrel may be equal to about 450, for example. The plies are wound on a frustoconical piston 72 which can be moved in translation parallel to the axis 71 of the mandrel.

The mandrel 70 is rotated about its axis (arrow f2) by a motor 74, while the piston 72 is moved in translation by telescopic actuators 76 interposed between the piston 72 and a base 77 of the mandrel.

The strip of cloth 10 is taken from the end of the mandrel remote from the piston 72 to be wound onto the turntable 30. The strip of cloth is wound onto the turntable 30 in flat superposed turns and the superposed turns are needled in the manner described with reference to FIGS. 3 and 4.

A circuit 78 controls the motors 30 and 74 and the actuators 76 so that rotation of the mandrel 70 and advance of the stack 73 of frustoconical plies along the mandrel are synchronized with rotation of the turntable 30 (arrow f3) so that the strip of cloth 10 is laid with an appropriate shape, i.e. without deforming the strip of cloth, on the preform 60 that is in the process of being needled. A presser cylinder 79 carried by the support 34 can be provided upstream from the needle board 50 to improve presentation of the strip of cloth 10 prior to needling.

In FIGS. 3 to 7, the helical cloth 10 is wound in flat superposed annular turns extending perpendicularly to the axis of the preform.

Figure 8:
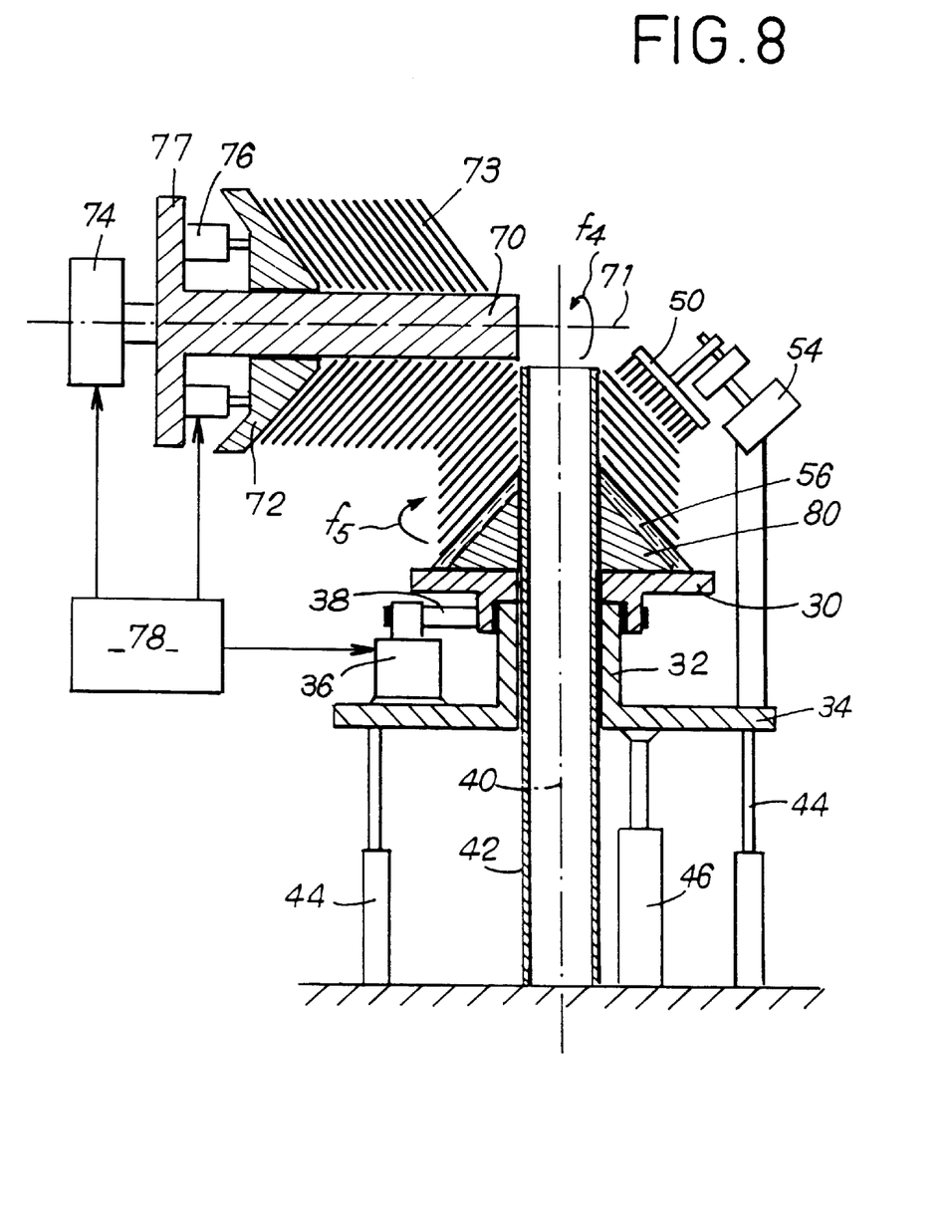
FIG. 8 is a highly diagrammatic view in elevation and in section of a second implementation of a method of the invention.

It is possible to wind the helical cloth 10 in frustoconical turns, e.g. as shown in FIG. 8.

The embodiment shown in FIG. 8 differs from that of FIG. 7 in that the turntable 30 which supports the preform that is being built up is provided with a frustoconical base 80 which defines the shape of the turns making up the preform 60.

The angle between the frustoconical turns of the preform 60 and the axis 40 is equal to 45°, as is the angle formed by the frustoconical plies of the strip of cloth 10 stored on the mandrel 70.

The turntable 30 and the mandrel 70 are rotated (arrows f5 and f4) at the same speed, and the stack 72 of plies on the mandrel 70 advances at a rate which is servo-controlled to the speed of rotation so that the strip of helical cloth is transferred from the mandrel 70 to the turntable 30 with tangential contact between the stack 73 and the preform 60. There is no need to provide a presser wheel upstream from the needle board 50 as in the embodiment of FIG. 7.

The strip of cloth 10 is needled on the turntable 30 using the same principles as those described with reference to FIGS. 3 and 4, the needle board 50 sloping relative to the horizontal at an angle of 45° so that the needles penetrate into the turns of the preform 60 perpendicularly thereto. The position of the needle board 50 is chosen to avoid any interference between the needles and the guide tube 42, or else it is provided with a covering analogous to the base felt 56 covering the frustoconical base 60.

Winding the preform 60 with frustoconical turns makes it possible, after it has been sliced into annular brake disk preforms, to have friction faces that are not parallel to the layers of cloth.

In the above, it is assumed that annular brake disk preforms are being made of carbon-carbon composite. The invention is applicable to making annular preforms for carbon-carbon composite parts having other applications, e.g. wheels. The invention is also applicable to making annular preforms for parts made of composite material other than carbon-carbon, the nature of the fibers in the preform being selected as a function of the material desired for the fiber reinforcement of the composite parts.

We claim:

1. A method of making fiber preforms for manufacturing annular parts made of composite material, the method comprising:

providing a strip of spirally- or helically-shaped cloth having substantially helical warp yarns and substantially radial weft yarns, the mass per unit area of the warp of the helical cloth increasing from an inside diameter to an outside diameter an increase in mass per unit area of the warp at least approximately compensating, in terms of density per unit volume of the preform, a decrease in density of the weft from the inside diameter to the outside diameter;

winding superposed layers of the strip of spirally- or helically-shaped cloth; and needling the layers of the strip of cloth to bond the layers together by fibers pulled from the yarns of the cloth.

2. A method according to claim 1, wherein in the step of providing the strip of cloth, the cloth is made up at least in part of yarn comprising parallel discontinuous fibers.

3. A method according to claim 2, wherein in the step of providing the strip of cloth, the cloth is constituted at least in part by yarn comprising parallel discontinuous fibers held together by a sacrificial covering yarn, and further comprising the step of eliminating the covering yarn prior to needling.

4. A method according to claim 2, wherein in the step of providing the strip of cloth, the cloth is constituted at least in part by yarn comprising discontinuous fibers held together by a small amount of twisting.

5. A method according to claim 1, wherein in the step of providing the strip of cloth, the size of the warp yarns increases from the inside diameter to the outside diameter.

6. A method according to claim 1, wherein in the step of providing the strip of cloth, the density of the warp yarns increases from the inside diameter to the outside diameter.

7. A method according to claim 1, wherein the needling step is performed with a density of needle strokes per unit area that is substantially constant over the entire surface of the layers of the strip of cloth.

8. A method according to claim 1, wherein the needling step is performed with a set of needles covering a sector extending over the entire width of the strip of cloth.

9. A method according to claim 1, wherein the needling step is performed to a substantially constant depth.

10. A method according to claim 1, wherein the needling step is performed progressively while the strip of cloth is being wound flat.

11. A method according to claim 1, wherein in the step of winding superposed layers of the strip, the strip of cloth is wound around an axis, building up superposed layers that are substantially perpendicular to said axis.

12. A method according to claim 1, wherein in the step of winding superposed layers of the strip, the strip of cloth is wound around an axis to form superposed layers that are frustoconical.

13. A method according to claim 1, wherein in the step of winding superposed layers of the strip, the strip of cloth is wound around a tube.

14. A method according to claim 1, further comprising storing the strip of cloth on a tray having a radial slot therein, and in the step of winding superposed layers, pulling the strip of cloth through the radial slot.

15. A method according to claim 1, further comprising storing the strip of cloth on a mandrel wound to form a stack of superposed frustoconical plies.

16. A method according to claim 15, further comprising taking the strip of cloth from the mandrel and winding the strip of cloth onto a turntable to form a preform made up of superposed frustoconical turns, with the strip of cloth being transferred by tangential contact between the stack of frustoconical plies on the mandrel and the preform that is being built up.

17. A method according to claim 1, wherein in the step of winding the superposed layers, the strip of cloth is wound flat and the step of needling is performed continuously while the strip of cloth is being wound so as to form a tube, and further comprising slicing the tube to provide preforms for manufacturing annular parts.

18. A method according to claim 1, comprising a step of making annular preforms for composite material brake disks.

19. A method according to claim 3, wherein:
in the step of providing the strip of cloth, the size of the warp yarns increases from the inside diameter to the outside diameter and the density of the warp yarns increases from the inside diameter to the outside diameter;
the needling step is performed with a density of needle strokes per unit area that is substantially constant over the entire surface of the layers of the strip of cloth;
the needling step is performed by means of a set of needles covering a sector extending over the entire width of the strip of cloth;
the needling step is performed to a substantially constant depth; and
the needling step is performed progressively while the strip of cloth is being wound flat.

20. A method according to claim 4, wherein:
in the step of providing the strip of cloth, the size of the warp yarns increases from the inside diameter to the outside diameter and the density of the warp yarns increases from the inside diameter to the outside diameter;
the needling step is performed with a density of needle strokes per unit area that is substantially constant over the entire surface of the layers of the strip of cloth;
the needling step is performed by means of a set of needles covering a sector extending over the entire width of the strip of cloth;
the needling step is performed to a substantially constant depth; and
the needling step is performed progressively while the strip of cloth is being wound flat.

21. A method according to claim 9, wherein in the step of winding the superposed layers:
the strip of cloth is wound around an axis, building up superposed layers that are substantially perpendicular to said axis;
the strip of cloth is wound around an axis to form superposed layers that are frustoconical;
the strip of cloth is wound around a tube; and
the strip of cloth is stored on a tray from which it is pulled through a radial slot.

22. A method according to claim 13, further comprising storing the strip of cloth on a mandrel wound to form a stack of superposed frustoconical plies.

23. A method according to claim 22, further comprising taking the strip of cloth from the mandrel and winding the strip onto a turntable to form a preform made up of superposed frustoconical turns, with the strip of cloth being transferred by tangential contact between the stack of frustoconical plies on the mandrel and the preform that is being built up.

24. A method according to claim 20, wherein in the step of winding the superposed layers, the strip of cloth is wound flat and the step of needling is performed continuously while the strip of cloth is being wound so as to form a tube, and further comprising slicing the tube to provide preforms for manufacturing annular parts.

25. A method according to claim 19, comprising a step of making annular preforms for composite material brake disks.

26. A method according to claim 20, comprising a step of making annular preforms for composite material brake disks.

27. A method according to claim 21, comprising a step of making annular preforms for composite material brake disks.

28. A method according to claim 22, comprising a step of making annular preforms for composite material brake disks.

29. A method according to claim 23, comprising a step of making annular preforms for composite material brake disks.

* * * * *

UNITED STATES PATENT AND TRADEMARK OFFICE
CERTIFICATE OF CORRECTION

PATENT NO. : 6,009,605
DATED : January 4, 2000
INVENTOR(S) : Pierre Olry, et. al.

It is certified that error appears in the above-identified patent and that said Letters Patent is hereby corrected as shown below:

Front page, [73] Assignee, "Societe National D'Etude et de Construction de Moteurs D'Aviation, Paris, France", should read

--SOCIETE NATIONALE D'ETUDE ET DE CONSTRUCTION DE MOTEURS D'AVIATION
2, boulevard du Général Martial Valin
75015 PARIS, FRANCE and
HEXCEL FABRICS
3, avenue Condorcet
69100 VILLEURBANNE, FRANCE--; and Column 7, line 8, "450", should read --45°--.

Signed and Sealed this

Eighth Day of May, 2001

Attest:

NICHOLAS P. GODICI

Attesting Officer

Acting Director of the United States Patent and Trademark Office